US008805904B2

(12) United States Patent
Yu (10) Patent No.: US 8,805,904 B2
(45) Date of Patent: Aug. 12, 2014

(54) METHOD AND APPARATUS FOR CALCULATING THE NUMBER OF LEADING ZERO BITS OF A BINARY OPERATION

(75) Inventor: Hyeong-Seok Yu, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 474 days.

(21) Appl. No.: 13/171,536

(22) Filed: Jun. 29, 2011

(65) Prior Publication Data

US 2012/0203811 A1 Aug. 9, 2012

(30) Foreign Application Priority Data

Feb. 8, 2011 (KR) ........................ 10-2011-0011214

(51) Int. Cl.
*G06F 7/00* (2006.01)
(52) U.S. Cl.
USPC ........................................ 708/211
(58) Field of Classification Search
None
See application file for complete search history.

(56) References Cited

U.S. PATENT DOCUMENTS

| 5,493,520 | A | | 2/1996 | Schmookler et al. |
| 5,699,285 | A | | 12/1997 | Miyanishi et al. |
| 5,796,644 | A | | 8/1998 | Jiang |
| 6,028,987 | A | * | 2/2000 | Hirairi .................... 716/103 |
| 6,487,576 | B1 | * | 11/2002 | Giacalone et al. ........... 708/525 |
| 8,489,663 | B2 | * | 7/2013 | Wang .................... 708/505 |
| 2010/0312812 | A1 | * | 12/2010 | Wang .................... 708/505 |
| 2012/0203811 | A1 | * | 8/2012 | Yu ....................... 708/211 |
| 2013/0282779 | A1 | * | 10/2013 | Wang .................... 708/211 |

FOREIGN PATENT DOCUMENTS

| JP | 1995-295790 | 11/1995 |
| KR | 10-1998-0041731 | 8/1998 |
| KR | 10-0223997 | 10/1999 |
| KR | 10-2004-0033198 | 4/2004 |

* cited by examiner

*Primary Examiner* — David H Malzahn
(74) *Attorney, Agent, or Firm* — NSIP Law (57) ABSTRACT

Provided are an apparatus and method for calculating the number of leading zero bits of a binary operation. The apparatus and method may accurately predict the number of leading zero bits using a binary tree structure of an input operand for a binary operation and reduce operation delay time due to the increase in number of bits of the operand. The method may include generating $2^n$ first functions by performing a logical operation on two input binary numbers on a bit-by-bit basis, calculating a second function by combining the first functions and a leading zero bit candidate value of the second function, and determining a final number of leading zero bits by recursively performing the calculating.

17 Claims, 9 Drawing Sheets

| FIRST FUNCTION COMBINATION | | SECOND FUNCTION COMBINATION | | | LEADING ZERO BIT NUMBER CANDIDATE VALUE | |
| --- | --- | --- | --- | --- | --- | --- |
| FIRST FUNCTION | FIRST FUNCTION | SECOND FUNCTION | STATE INFORMATION | | FIRST CANDIDATE | SECOND CANDIDATE |
| P | P | P | X | | 0 | 0 |
| P | T | T | 1 | | 0 | 0 |
| P | G | G | 0 | | 1 | 1 |
| T | P | T | 1 | | 1 | 0 |
| T | T | T | 0 | | 1 | 1 |
| T | G | T | 1 | | 0 | 0 |
| G | P | G | 1 | | 1 | 0 |
| G | T | G | 0 | | 1 | 1 |
| G | G | G | 1 | | 0 | 0 |

| SECOND FUNCTION COMBINATION | | | UPDATED SECOND FUNCTION INFORMATION | | LEADING ZERO BIT NUMBER CANDIDATE VALUE | | SELECTION VALUE | |
|---|---|---|---|---|---|---|---|---|
| SECOND FUNCTION | STATE INFORMATION | SECOND FUNCTION | STATE INFORMATION | UPDATED SECOND FUNCTION | UPDATED STATE INFORMATION | FIRST CANDIDATE | SECOND CANDIDATE | FIRST CANDIDATE | SECOND CANDIDATE |
| P | 0 | P | 0 | P | X | 0 | 0 | XX | XX |
| P | 0 | T | 0 | T | 1 | 0 | 0 | 0X | 0X |
| P | 0 | G | 0 | G | 0 | 1 | 1 | 1X | 1X |
| T | 0 | P | 0 | T | 1 | 1 | 0 | 1X | 0X |
| T | 0 | T | 0 | T | 0 | 1 | 1 | XX | XX |
| T | 0 | G | 0 | G | 1 | 0 | 0 | XX | XX |
| G | 0 | P | 0 | G | 0 | 1 | 0 | 1X | 0X |
| G | 0 | T | 0 | G | 1 | 0 | 1 | XX | XX |
| G | 0 | G | 0 | G | 0 | 0 | 0 | XX | XX |

FIG. 4B

| SECOND FUNCTION COMBINATION | | | | UPDATED SECOND FUNCTION INFORMATION | | LEADING ZERO BIT NUMBER CANDIDATE VALUE | | SELECTION VALUE | |
|---|---|---|---|---|---|---|---|---|---|
| SECOND FUNCTION | STATE INFORMATION | SECOND FUNCTION | STATE INFORMATION | UPDATED SECOND FUNCTION | STATE INFORMATION | FIRST CANDIDATE | SECOND CANDIDATE | FIRST CANDIDATE | SECOND CANDIDATE |
| P | 0 | P | 1 | P | X | 0 | 0 | XX | XX |
| P | 0 | T | 1 | T | 1 | 0 | 0 | 0X | 0X |
| P | 0 | G | 1 | G | 1 | 1 | 1 | 10 | 11 |
| T | 0 | P | 1 | T | 1 | 1 | 0 | 1X | 0X |
| T | 0 | T | 1 | T | 1 | 1 | 1 | 10 | 11 |
| T | 0 | G | 1 | G | 1 | 0 | 0 | 0X | 0X |
| G | 0 | P | 1 | G | 1 | 1 | 0 | 1X | 0X |
| G | 0 | T | 1 | G | 1 | 1 | 1 | 10 | 11 |
| G | 0 | G | 1 | G | 1 | 0 | 0 | 0X | 0X |

FIG. 4C

| SECOND FUNCTION COMBINATION ||| UPDATED SECOND FUNCTION INFORMATION || LEADING ZERO BIT NUMBER CANDIDATE VALUE || SELECTION VALUE ||
|---|---|---|---|---|---|---|---|---|
| SECOND FUNCTION | STATE INFORMATION | SECOND FUNCTION | STATE INFORMATION | UPDATED SECOND FUNCTION | STATE INFORMATION | FIRST CANDIDATE | SECOND CANDIDATE | FIRST CANDIDATE | SECOND CANDIDATE |
| P | 1 | P | 0 | P | X | 0 | 0 | XX | XX |
| P | 1 | T | 0 | T | 1 | 0 | 0 | 0X | 0X |
| P | 1 | G | 0 | G | 0 | 1 | 1 | 1X | 1X |
| T | 1 | P | 0 | T | 1 | 0 | 0 | 00 | 01 |
| T | 1 | T | 0 | T | 1 | 0 | 0 | 00 | 00 |
| T | 1 | G | 0 | T | 1 | 0 | 0 | 01 | 01 |
| G | 1 | P | 0 | G | 1 | 0 | 0 | 00 | 01 |
| G | 1 | T | 0 | G | 1 | 0 | 0 | 00 | 00 |
| G | 1 | G | 0 | G | 1 | 0 | 0 | 01 | 01 |

FIG. 4D

| SECOND FUNCTION COMBINATION | | | UPDATED SECOND FUNCTION INFORMATION | | LEADING ZERO BIT NUMBER CANDIDATE VALUE | | SELECTION VALUE | |
|---|---|---|---|---|---|---|---|---|
| SECOND FUNCTION | STATE INFORMATION | SECOND FUNCTION | UPDATED SECOND FUNCTION | STATE INFORMATION | FIRST CANDIDATE | SECOND CANDIDATE | FIRST CANDIDATE | SECOND CANDIDATE |
| P | 1 | P | P | x | 0 | 0 | xx | xx |
| P | 1 | T | T | 1 | 0 | 0 | 0x | 0x |
| P | 1 | G | G | 1 | 1 | 1 | 10 | 11 |
| T | 1 | P | T | 1 | 0 | 0 | 00 | 01 |
| T | 1 | T | T | 1 | 0 | 0 | 00 | 00 |
| T | 1 | G | G | 1 | 0 | 0 | 01 | 01 |
| G | 1 | P | G | 1 | 0 | 0 | 00 | 01 |
| G | 1 | T | G | 1 | 0 | 0 | 00 | 00 |
| G | 1 | G | G | 1 | 0 | 0 | 01 | 01 |

# METHOD AND APPARATUS FOR CALCULATING THE NUMBER OF LEADING ZERO BITS OF A BINARY OPERATION

CROSS-REFERENCE TO RELATED APPLICATION(S)

This application claims the benefit under 35 U.S.C. §119 (a) of Korean Patent Application No. 10-2011-0011214, filed on Feb. 8, 2011, in the Korean Intellectual Property Office, the entire disclosure of which is incorporated herein by reference for all purposes.

BACKGROUND

1. Field

The following description relates to a method and apparatus for calculating the number of leading zero bits of a binary operation, and in addition, to a method and apparatus for calculating the number of leading zero bits algebraically by a binary operation that uses a binary tree structure.

2. Description of the Related Art

A leading zero anticipator (LZA) predicts the location of an initial '1' bit from the most significant bit (MSB) of a result of an addition or a subtraction of two input binary operands. In the case of addition or subtraction of normalized binary numbers, a result of an operation requires a shift of bits for normalization. In this case, the LZA may expedite an operation by predicting the bit shift simultaneously while performing the addition and/or subtraction operations.

In a floating-point addition or subtraction, a leading bit of '1' needs to be shifted to the most significant bit for normalization. For this bit shift, the number of '0' bits preceding the bit '1' are detected in the addition or subtraction result, and the bit shift is performed for the number of '0' bits. In this example, the LZA reduces a critical path delay by obtaining the location of the leading '1' bit and the number of '0' bits that are necessary for the bit shift at the same time that the addition or subtraction operation is performed.

The general LZA may produce an inaccurate prediction result if an error in the accurate digit location of the leading '1' bit is present. For example, the error may be caused by a carry from a lower bit that is not taken into consideration, and the prediction is performed in a direction from an upper bit to a lower bit of an input in implementation of an LZA. In addition, the general LZA may make accurate prediction by calculating the prediction result in parallel while taking into consideration the carry occurrence from a lower bit. However, in this example, the overall operation procedures increase complexity and overall operation time delay may occur.

SUMMARY

In one general aspect, there is provided a method of calculating the number of leading zero bits of a binary operation, the method including generating $2^n$ first functions by performing a logical operation on two input binary numbers on a bit-by-bit basis, calculating a second function by combining the first functions and a leading zero bit number candidate value of the second function, and determining a final number of leading zero bits by recursively performing the calculating n−1 more times.

The calculating of the second function and the leading zero bit number candidate value may comprise combining every two consecutive first functions into pairs, and calculating the second function from each pair of the first functions and the leading zero bit number candidate value of the second function according to predefined function combination requirements.

The calculating of the second function and the leading zero bit number candidate value may comprise calculating the second function and the leading zero bit number candidate value of the second function by combining the generated first function and a virtual first function, if the number of first functions is not $2^n$.

The determining of the final number of leading zero bits may comprise combining every two consecutive second functions into pairs, updating the second function of each pair and the leading zero bit number candidate value of each second function according to the predefined function combination requirements, and in response to there being only one second function remaining, determining a leading zero bit number candidate value of the second function as a final number of leading zero bits.

The updated leading zero bit number candidate value of the second function may be a value obtained by combining a leading zero bit number candidate value of the updated second function and one of a plurality of previously generated leading zero bit number candidate values of the second function.

Each of the second function and the updated second function may comprise two leading zero bit number candidate values.

The first function may be a logical operational function that generates a result value of 1 from a bitwise logical operation on the two binary numbers.

Each of the second function and the updated second function may comprise state change information.

The method may further comprise normalizing the input two binary numbers to $2^n$ bits prior to generating the $2^n$ first functions.

In another aspect, there is provided an apparatus for calculating the number of leading zero bits of a binary operation, the apparatus including a first function generation unit configured to generate $2^n$ first functions by performing a logical operation on two input binary numbers on a bit-by-bit basis, a second function generation unit configured to generate a second function by combining the first functions and a leading zero bit number candidate value of the second function, and a determination unit configured to control the second function generation unit to determine a final number of leading zero bits.

The first function generation unit may comprise a bit normalization unit configured to normalize the input two binary numbers to $2^n$ bits, and a logical operation unit configured to perform a bitwise logical operation on the two binary numbers which have been normalized by the bit normalization unit, to produce a resultant value of 1.

The second function generation unit may comprise a second function calculation unit configured to calculate the second function by combining every two consecutive first functions, and a candidate value calculation unit configured to calculate a leading zero bit number candidate value of the second function.

The second function generation unit may be further configured to combine a plurality of second function to calculate an updated second function, in response to the plurality of second functions not being a final function.

The candidate value calculation unit may comprise a candidate value generation unit configured to generate one or more leading zero bit number candidate values with reference to predefined function combination requirements stored in a storage unit, and a candidate value selection unit configured to select one of the leading zero bit number candidate values generated by the candidate value generation unit.

The apparatus of claim 10, wherein the second function generation unit is further configured to combine the generated first function and a virtual first function to calculate the second function and the leading zero bit number candidate value of the second function, in response to the number of first functions not being $2^n$.

The candidate value calculation unit may be further configured to combine the leading zero bit number candidate value generated by the candidate value generation unit with the leading zero bit number candidate value selected by the candidate value selection unit to update the leading zero bit number candidate value.

The determination unit may comprise a final function determination unit configured to determine whether the second function generated by the second function generation unit is a final function, and a control unit configured to determine the leading zero bit number candidate value calculated by the candidate value calculation unit as a final number of leading zero bits if the second function is a final function, and otherwise to control the second function generation unit to generate a new second function and a new leading zero bit number candidate value.

The determination unit may be configured to control the second function generation unit to determine a final number of leading zero bits by performing the combining of second functions n–1 times.

In another aspect, there is provided a method of calculating the number of leading zero bits of a binary operation, the method including generating less than $2^n$ first functions by performing a logical operation on two input binary numbers on a bit-by-bit basis, calculating a second function by combining the first functions and a leading zero bit number candidate value of the second function, wherein the calculating comprises adding at least one virtual second function to generate $2^n$ second functions, and determining a final number of leading zero bits by recursively performing the calculating n–1 more times.

The logical operations on the two input binary numbers may generate $2^n-1$ first functions, the calculating second functions based on the first functions may generate $2^{n-1}-1$ second functions, and the adding may comprises adding one virtual second function to generate $2^{n-1}$ second functions.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
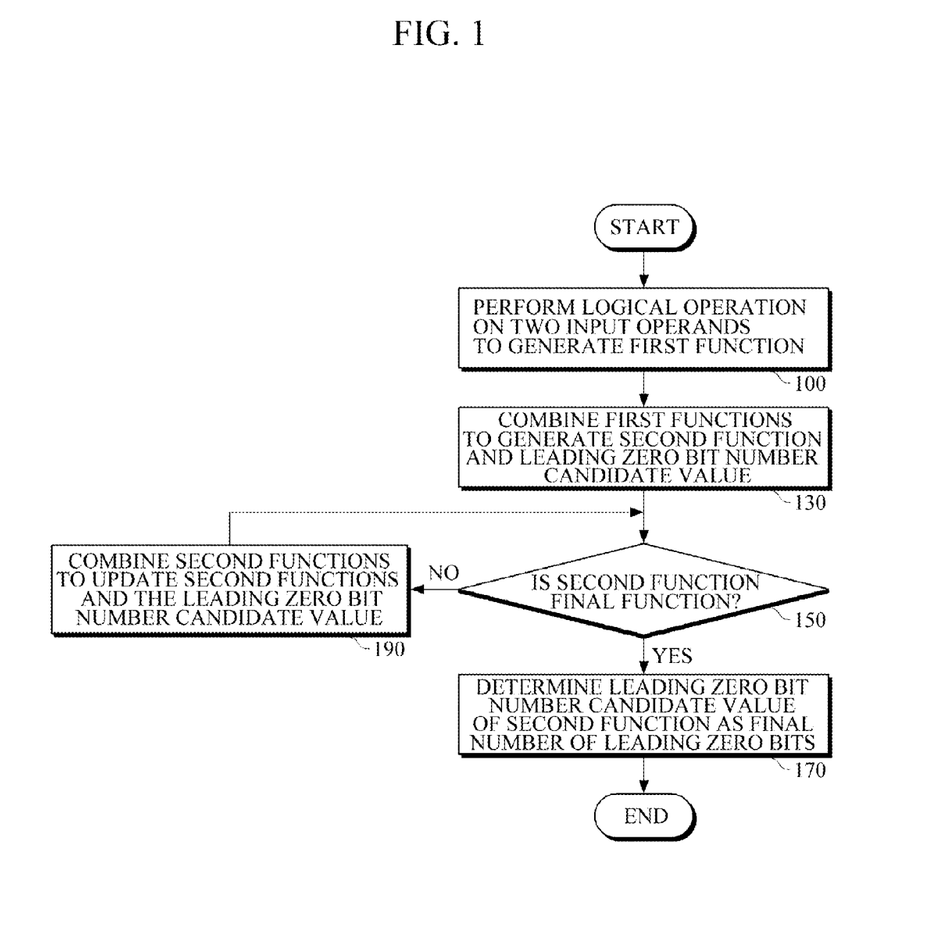
FIG. 1 is a diagram illustrating an example of a method for calculating the number of leading zero bits of a binary operation.

FIG. 1 illustrates an example of a method of calculating the number of leading zero bits of a binary operation.

Referring to an example illustrated in FIG. 1, two binary numbers are received, and first functions of two to the nth power are generated by performing a logical operation on a bit-by-bit basis (100). In this example, the two operands are input in the form of binary number, and each operand has $2^n$-bit number (bit length).

If the bit number of each input operand is not set to $2^n$, an input operand may be normalized such that the operand has a $2^n$-bit number. The input operand may have a bit of "0" added as a least significant bit. The first function is a bitwise logical function that is used to generate a result value of 1 for the logical operation performed on two binary numbers on a bit-by-bit basis.

As another example, if the bit number of each input operand is not set to $2^n$, it is not necessarily normalized to $2^n$. This example is described along with a second function. For example, a virtual function may be added to the first functions or to the second functions.

The first function may be set to a generation (G) function, a termination (T) function, and a propagation (P) function. For example, the generation function may perform an AND logical operation on two bits to produce a value of 1, the termination function may perform a NOT logical operation on two bits to produce a value of 1, and the propagation function may perform an XOR operation on two bits to produce a value of 1. In the generation function, two bits are added and a carry is generated in a most significant bit. In the termination function, a carry may be transmitted from an adjacent lower bit but not be transmitted to an upper bit and the function may be terminated. In the propagation function, a carry may be transmitted from an adjacent lower bit and transmitted to an upper bit.

For example, if two binary operands A="00011001" and B="11110011" are added together, the first function may be generated as follows. In this example, digits of A and B start from the leftmost digit. That is, A0 and B0 represent the most significant bits of A and B, and A7 and B7 represent the least significant bits of A and B. The first function of A7 and B7 is a generation function because a carry of 1 is generated when A7 and B7 are added together. The first function of two bits, A6 and B6, is a propagation function because a carry is not generated, but is enabled to be transmitted from a lower bit and transmitted to an upper bit when A6 and B6 are added. The first function of two bits A5 and B5 is a termination function because a carry is not generated and the operation is terminated without transmitting a carry transmitted from a lower bit to an upper bit when A5 and B5 are added. By performing a logical operation on the two operands A and B on a bit-by-bit basis as shown herein, the first function PPPGPTPG is generated.

The generated first function is combined to calculate the second function and a leading zero bit number candidate value of the second function (130). The second function may be generated by combining neighboring first functions as a sequential pair. The second function may be newly generated by combining the first functions. Accordingly, the number of the second functions may be reduced to half of the number of the first functions. Further, based on a predefined combination requirement for the combination of the first functions, the second function and the leading zero bit number candidate value may be calculated. An example of the second function and the leading zero bit number candidate value of the second function according to the combination of the first functions is described with reference to FIG. 2.

Figure 2:
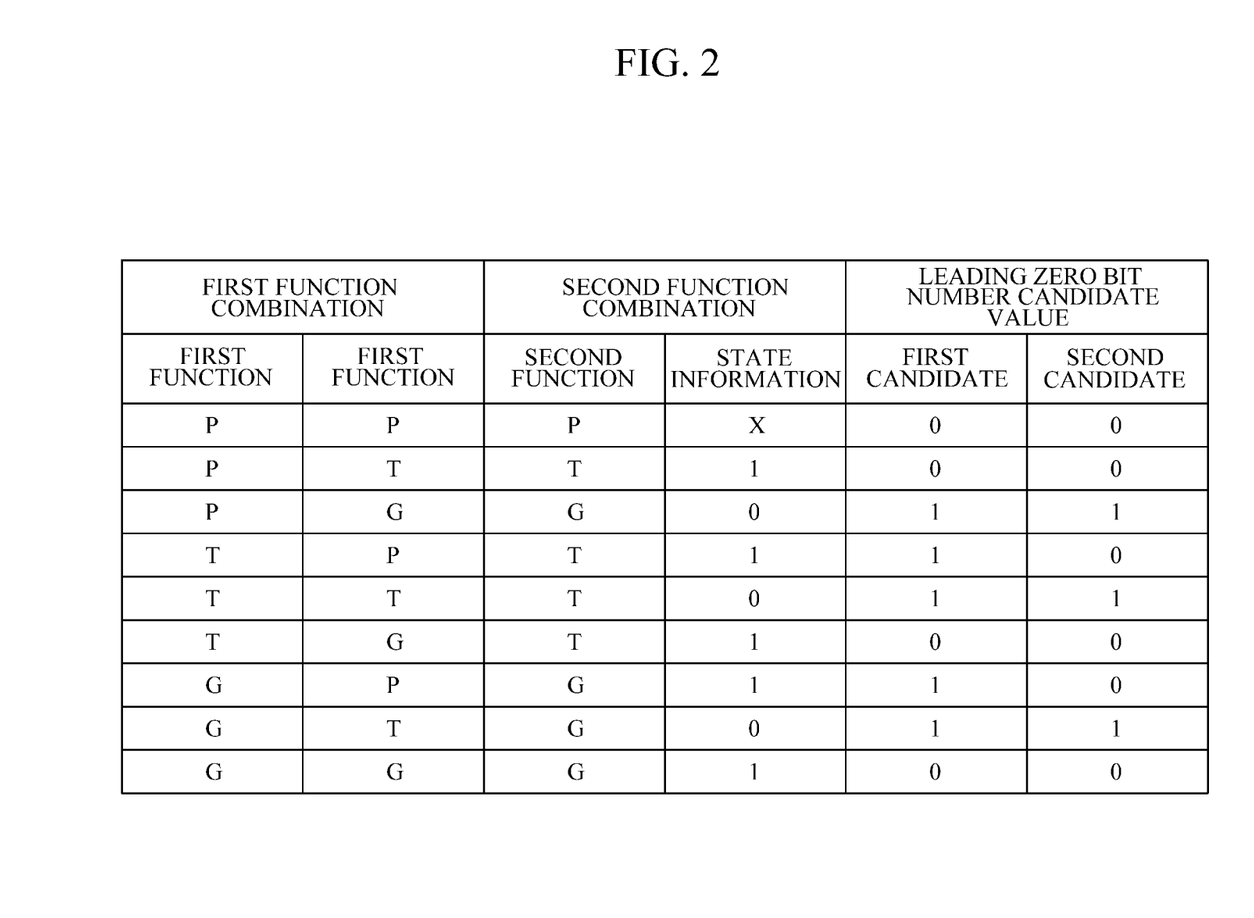
FIG. 2 is a diagram illustrating an example of a table for creating a function tree.

FIG. 2 illustrates an example of a table for creating a function tree.

Referring to the example illustrated in FIG. 2, first function combinations the three types generation, propogation, and termination. Each of a first function combination, a second function information, and a leading zero bit number candidate value may be experimentally calculated. The second function information contains state information of a second function. The second function may represent a function that substitutes for a first function, and the state information may indicate whether the newly generated second function has the same property as the first function. For example, if the second function is G, P, or T, the state information may indicate whether the second function has the same properties of carry generation and carry transmission as G, P, or T of the first function.

For example, in the case of a first function combination of P and T, the second function is T. In this example, because T is a termination function, a carry is not generated, nor is it transmitted. If the state information of the second function is 0, the second function may retain the same property that the first function has. Meanwhile, the state information of 1 indicates that the second function does not have the same property but a similar property as the first function. That is, in a case where the second function is T and state information is 1, the second function may represent a string of bits and may terminate the bit string regardless of the generation of a carry in the least significant position. However, the second function may have a "1" instead of "0" like in T of the first function. In the example illustrated in FIG. 2, X of the state information denotes an arbitrary value which does not affect the result.

In this example, a leading zero bit number candidate value is 1 bit, and each second function has two leading zero bit number candidate values. The leading zero bit number candidate value refers to a candidate value of the number of leading zero bits in a current stage. The leading zero bit number candidate value may be increased in bit number until the second function becomes a termination function, and a current candidate may be added by a leading zero bit number candidate value of a previous stage to generate a new value. In this example, one second function has two leading zero bit number candidate values. A first candidate of the leading zero bit number candidate values may be used to indicate a leading zero bit number candidate value for the most significant bit, and the leading zero bit number candidate values may be maintained as a part of a final zero bit number candidate value.

Referring again to FIG. 1, whether the second function is a single final function is determined (150). The $2^n$ first functions are combined to a single final function. For example, if one second function occurs, the second function is determined to be a final function, and an upper candidate value of leading zero bit number candidate values of the second function is determined as a final number of zero bits (170). If there are two or more second functions, they are not the final functions, and the second functions are combined to update a second function and the leading zero bit number candidate numbers (190). In this example, a second function may be updated according to a predefined function combination requirement, and leading zero bit number candidate values of the updated second function may be calculated. Such update is recursively performed until the second function is the final function.

By inputting two $2^n$-bit binary numbers, $2^n$ first functions may be generated, the first functions may be combined to generate second functions, and the second functions may be combined to generate a final function. Accordingly, a final function may be generated from the two $2^n$-bit binary numbers by combining second functions at n−1 stages, and the final number of leading zero bits may be calculated. That is, a final function may be generated by combining functions n times beginning with first functions. Procedures for generating a second function by combining two consecutive first functions and updating the second function are further described with reference to FIG. 3.

Figure 3:
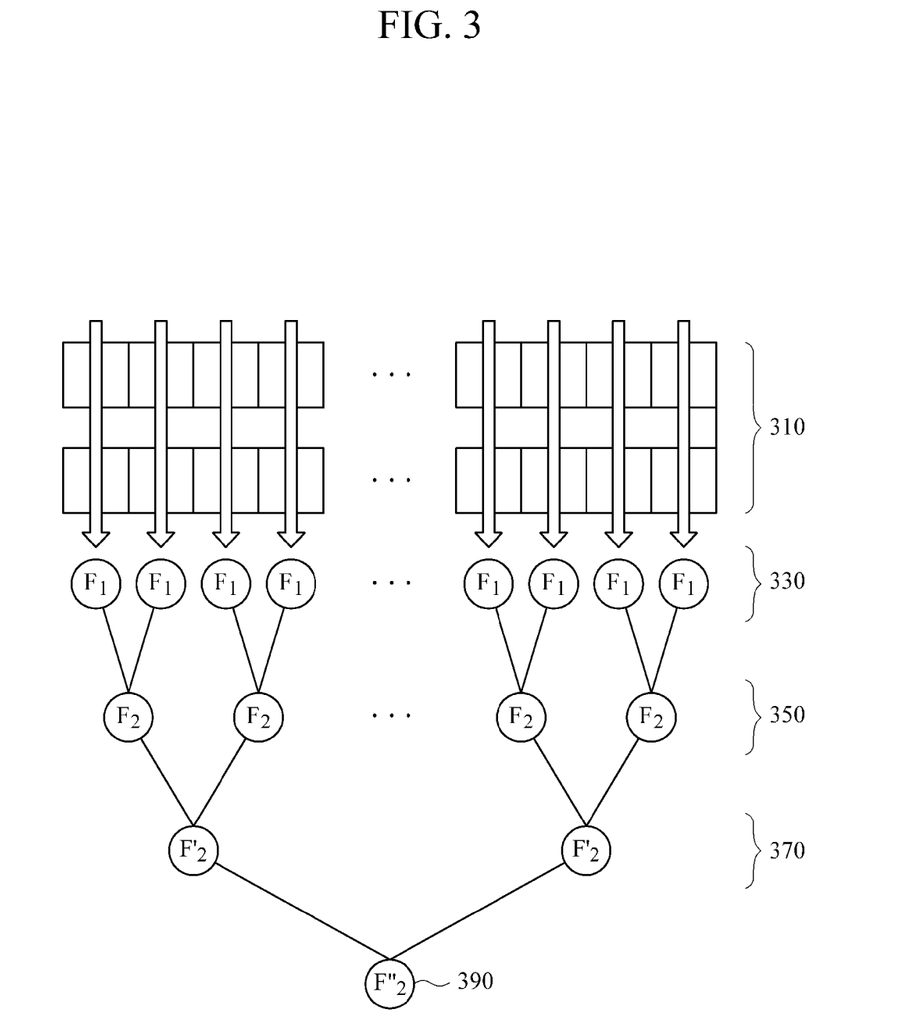
FIG. 3 is a diagram illustrating an example of a function tree.

FIG. 3 illustrates an example of a function tree.

Referring to the example illustrated in FIG. 3, as described in the examples herein, two operands 310 are input, and first functions 330 are generated for the respective digits. The operands may be $2^n$ bits or may be of another bit size. If the operand is not $2^n$ bits, the operand may be normalized to generate an operand having a bit size of $2^n$. In this example, the total number of first functions 330 is $2^n$. Starting from the most significant bit, every two consecutive first functions 330 are combined. A combination of the two first functions 330 forms a second function 350. Because the number of first functions 330 is $2^n$, the number of the second functions 350 is $2^{n-1}$. If there are two or more second functions 350, a final function 390 has yet to be generated, and the second functions 350 are sequentially paired, thereby updating the second functions 350.

The updated second functions 370 may be updated according to the combination requirement for the second functions 350. Such update procedure may be recursively performed until only one second function remains. For example, the second functions may be combined a total of n−1 times. Thus, the remaining one second function is determined as a final function 390, and a leading zero bit number candidate values of the final function 390 may be updated by combining the candidate values with leading zero bit number candidate values of the preceding function. The final function 390 has two leading zero bit number candidate values that increase in bit number by combining the candidate values with the leading zero bit number candidate values of a preceding function. An upper bit from among the leading zero bit number candidate values is the final number of leading zero bits. Procedures for generating the updated second function 370 by combining the second functions 350 and leading zero bit number candidate values of the updated second function 370 are further described with reference to FIGS. 4A to 4D.

As another example, a bit number of the first function is not necessarily $2^n$. As described herein, if a bit number of the input operand is not $2^n$, the first function may be normalized to $2^n$, or a virtual second function may be added if the second functions are combined, and the final second function may be calculated. For example, in the case of an input 24-bit operand, eight "0" bits may be added as the least significant bit to each operand to normalize the 24-bit operand to 32 bits, or the first function may be calculated without normalization.

In this example there are twenty-four (24) first functions, and the second functions are updated by combining neighboring bits while being reduced in number from 12 to 6, and from 6 to 3. In this example, if there are three second functions, a virtual second function may be assigned to obtain a final second function value. The virtual second function may be set to a termination function and a state information function may be set to '0.' For example, three second functions and one virtual second function may be combined into two second functions, and the two second functions may be combined into a final second function.

As another example, in a case in which each of input operands is 31 bits, one "0" bit may be added as the least significant bit to each operand, and the input operands may be normalized to 32 bits. In this example, thirty (30) first functions may be calculated and combined into fifteen (15) second functions. The remaining one first function may be combined with a virtual first function to generate one second function. Accordingly, sixteen (16) second functions may be generated. Accordingly, unnecessary use of hardware may be reduced without errors in operation.

FIGS. 4A to 4D illustrate examples of second function combination tables for updating second functions.

Referring to examples of FIGS. 4A to 4D, second function information may be updated using second function information that is generated by combining the first functions. The second function information may contain the second function and state information of the second function. Accordingly, based on the combination and bit values for P, T, and G, there are thirty-six second function information combinations. By combining two second functions (including state information), one updated second function and state information of the updated second function may be obtained. For example, the updated second function and its state information may be experimentally obtained. The number of the second functions updated according to the above procedure is reduced to half of the number of the original second functions. Referring to FIGS. 4A-4D, nine of the thirty-six possible second function information combinations are illustrated in each of the figures.

The leading zero bit number candidate value may be set to an inherent value for each function. In this example, a first candidate is an upper bit, and a second candidate is a lower bit. Both the first and second candidates are the leading zero bit number candidate values. A selection value may be used to calculate a leading zero bit number candidate value of an updated second function. As described herein, each second function or each updated second function has two 1-bit inherent leading zero bit number candidate values. The second functions may be reduced in half through the update procedures. A leading zero bit number candidate value of the updated second function may be updated by combining the leading zero bit number candidate value with one selected from the leading zero bit number candidate values of a preceding second function.

For example, in the case of adding two binary operands, A=00011001 and B=11110011, the first functions are PPPGPTPG. Every two consecutive first functions are combined from left to right. In this example, (PP), (PG), (PT), and (PG) are generated, and based on the combinations of the first functions, second functions and their leading zero bit number candidate values may be calculated with reference to the table shown in FIG. 2. In this example, (PP) includes a second function (including state information) P0 and two leading zero bit number candidate values (0, 0). In a similar manner, the second functions and their leading zero bit number candidate values, P0 (0, 0)/G0 (1, 1)/T1 (0, 0)/and G0 (1, 1) are obtained. Because a total of four second functions are generated, the second functions are combined into two updated second functions with reference to the tables shown in FIGS. 4A to 4D. For example, P0 (0, 0) and G0 (1, 1) are combined to generate an updated second function G0, and its leading zero bit number candidate values are (11, 11).

Figure 4A:
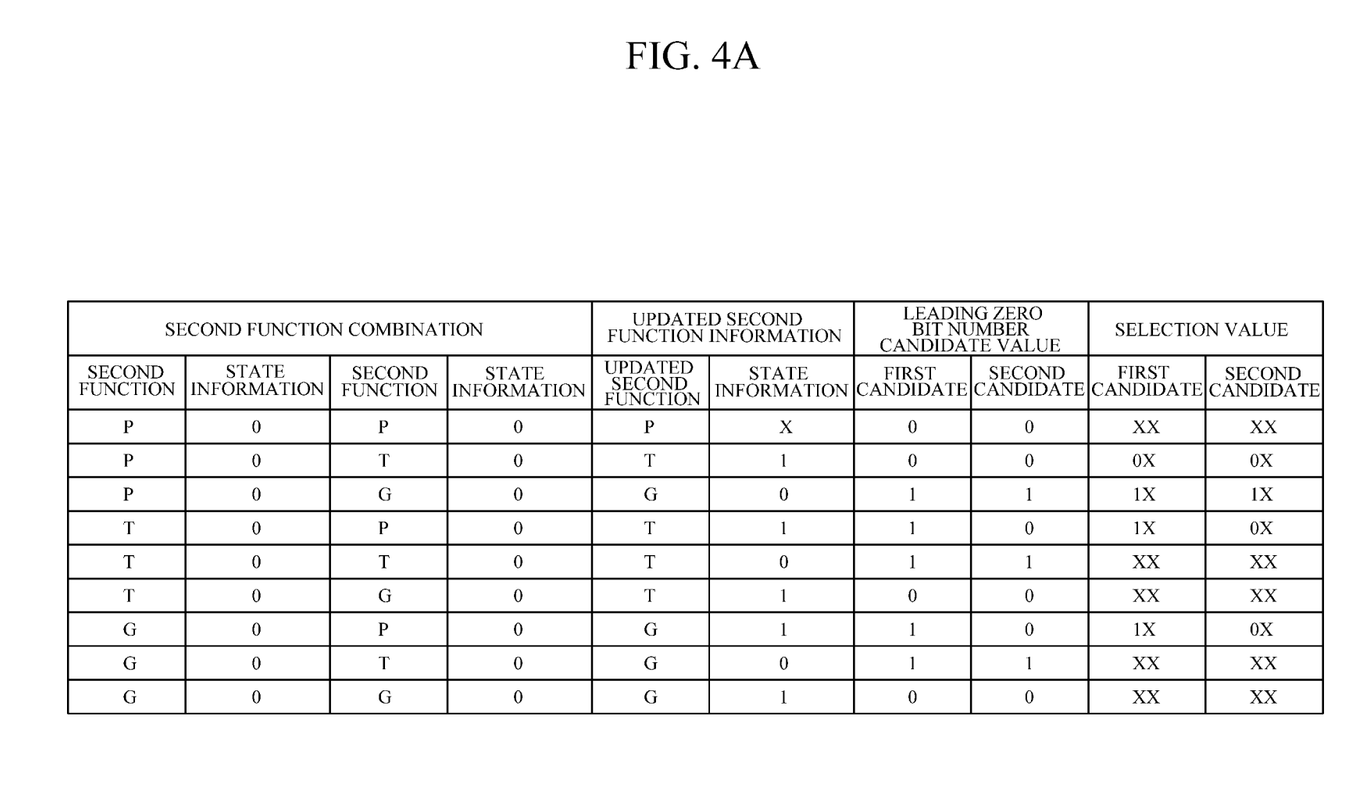
FIGS. 4A to 4D are diagrams illustrating examples of second function combination tables for updating second functions.
Figure 4B:
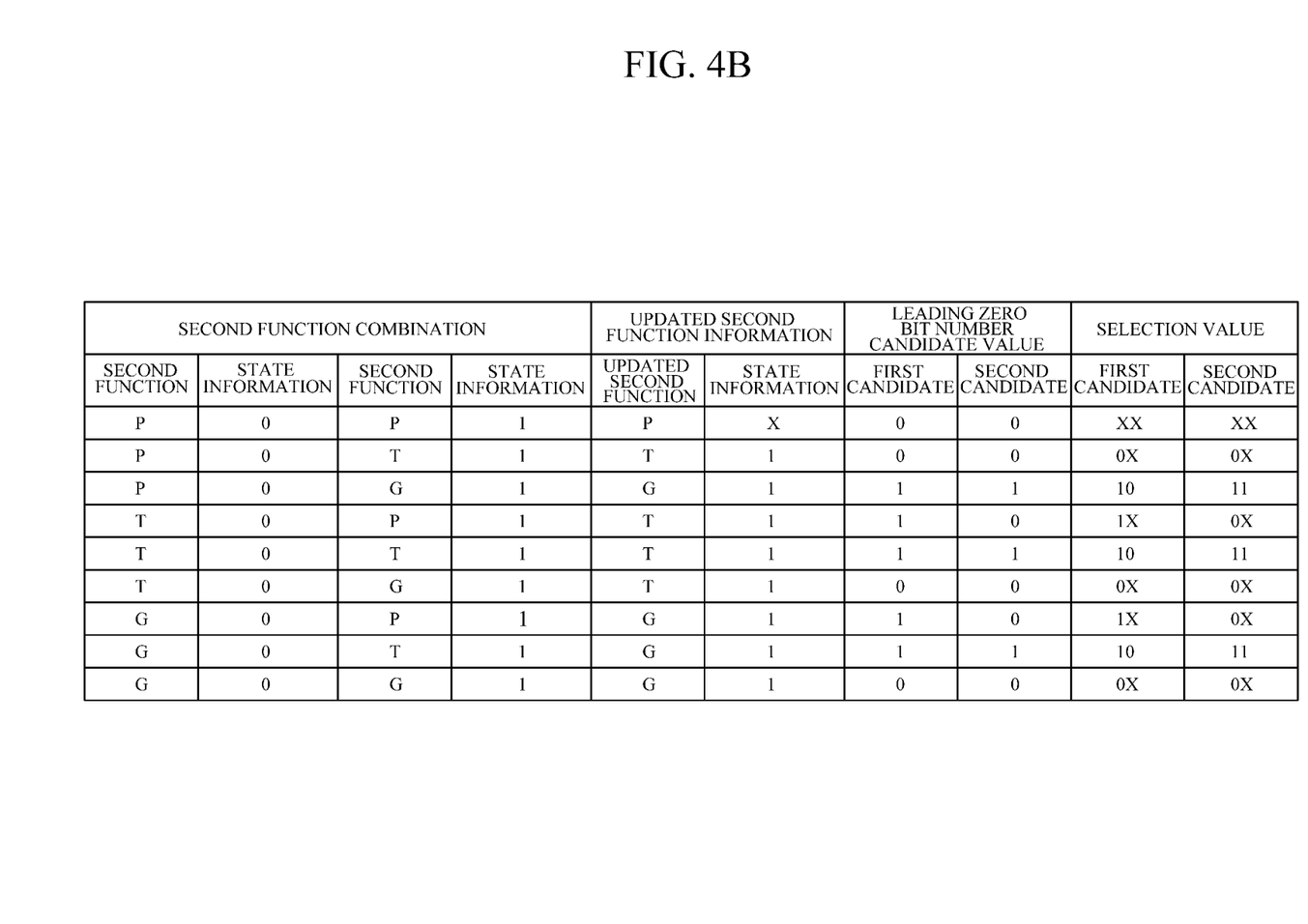
Figure 4C:
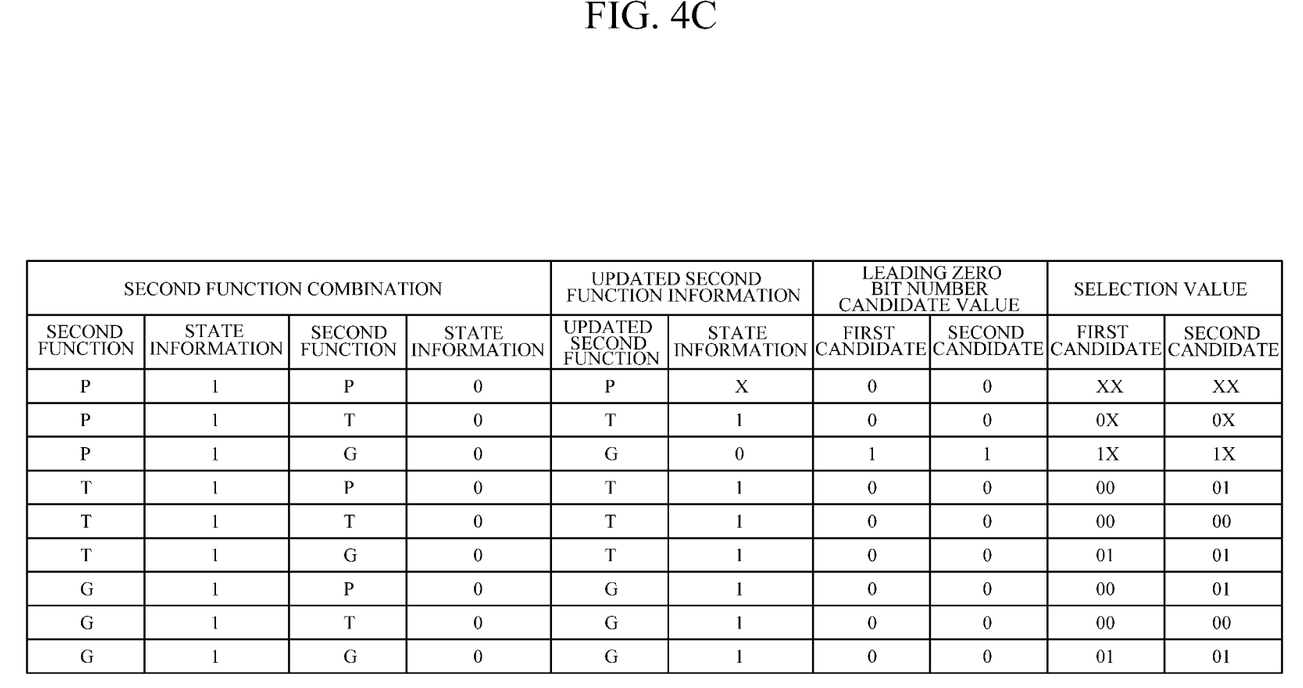
Figure 4D:
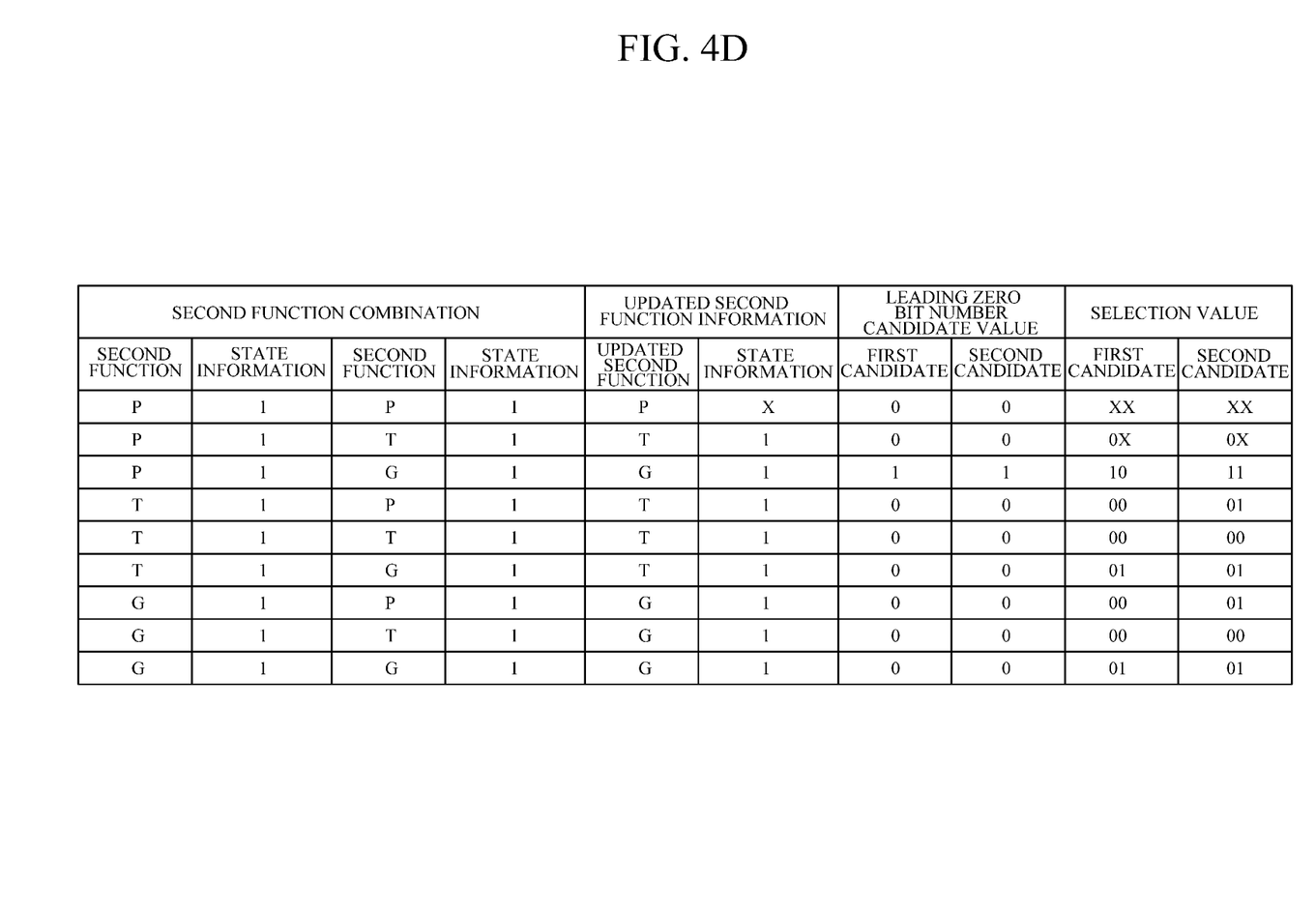

To generate the leading zero bit number candidate value, in this example each of current zero bit number candidate values (1, 1) shown in FIG. 4A is assigned as an upper bit and one is selected as a lower bit from the leading zero bit number candidate values (0, 0) and (1, 1) of preceding second functions. In this example, the third and fourth leading zero bit number candidate values of the preceding second function are selected, and accordingly the leading zero bit number candidate values of the updated second function are (11, 11). As such, the updated second functions and their leading zero bit number candidate values are G0 (11, 11) and T1 (00, 00). Because two updated second functions are present, the updated second functions are combined to obtain a final function. As a result, the final function G1 is obtained and its leading zero bit number candidate values are (100, 100). In this case, a final zero bit is represented as '100' which is the leading zero bit number candidate value for the most significant bit. Accordingly, a result of adding the two operands has 4 leading zero bits.

Meanwhile, in the case of subtracting two binary operands, one operand may be transformed by use of complement of 2, the two operands may be added together, and the above leading zero bit number calculation may be performed on the resultant value, thereby obtaining a leading zero bit number.

Figure 5A:
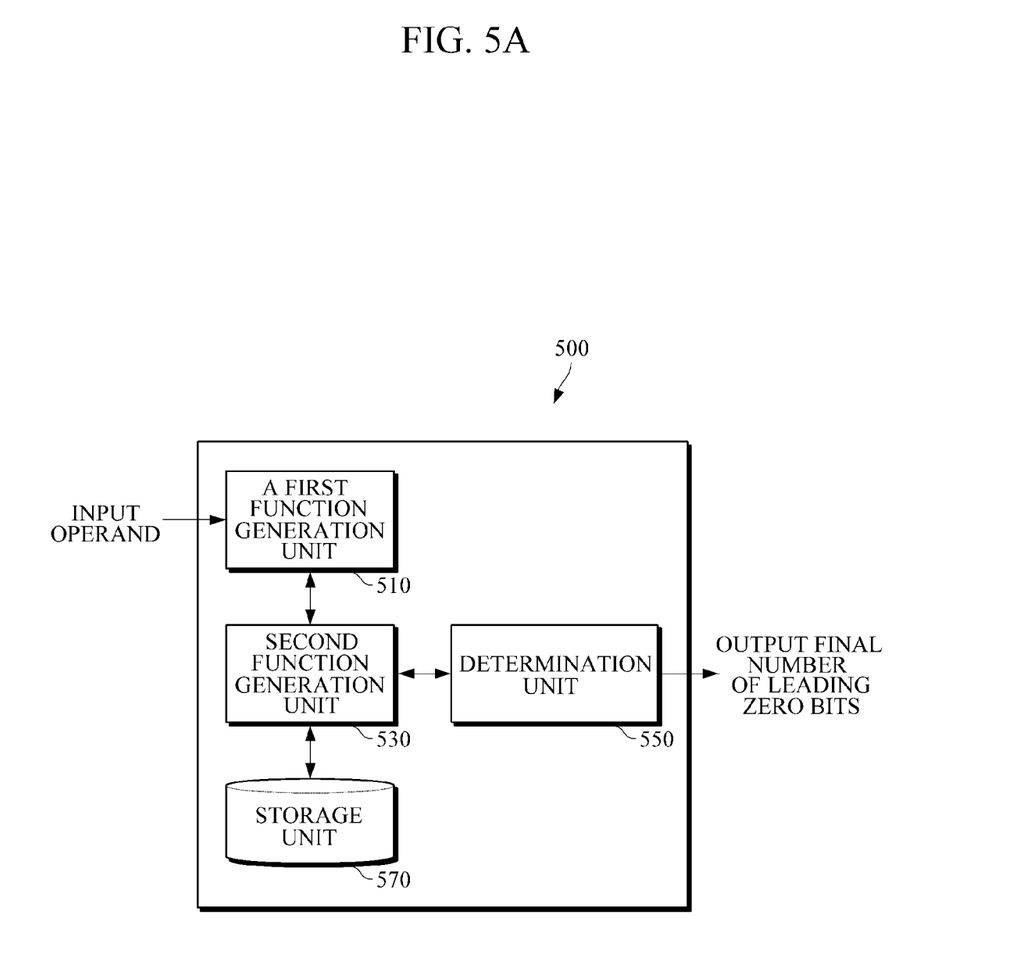
FIG. 5A is a diagram illustrating an example of a leading zero bit number calculation apparatus.

FIG. 5A illustrates an example of a leading zero bit number calculation apparatus.

Referring to the example shown in FIG. 5A, the leading zero bit number calculation apparatus 500 includes a first function generation unit 510, a second function generation unit 530, a determination unit 550, and a storage unit 570. The first function generation unit 510 may be a logical operation circuit. The first function generation unit 510 may perform a logical operation on two input binary numbers on a bit-by-bit basis to generate $2^n$ first functions. For example, the first function generation unit 510 may include a bit-normalization unit (not illustrated) to normalize the two binary numbers to $2^n$ bits and a logical operation unit (not illustrated) to perform a bitwise logical operation on the two normalized binary numbers such that a result of the operation is a value of 1. The first function generation unit 510 may output the first functions to the second function generation unit 530.

The second function generation unit 530 may combine the first functions into second functions. For example, the second function generation unit 530 may generate the second functions using function combination requirements that are previously stored in the storage unit 570. The second function generation unit 530 may calculate a leading zero bit number candidate value of each second function. The second function generation unit 530 may calculate a leading zero bit number candidate value of a second function that satisfies the function combination requirements that are previously stored in the storage unit 590. The determination unit 550 may control the second generation unit 530 to determine the final number of leading zero bits. The determination unit 550 may determine if the second function output from the second function generation unit 530 is a final function, and output a leading zero bit number candidate value as a final leading zero bit number based on the result of the determination.

As another example, in a case in which the number of first functions is not $2^n$, a virtual first function may be combined with the generated first functions to generate the second functions and their leading zero bit number candidate values, as described above.

Figure 5B:
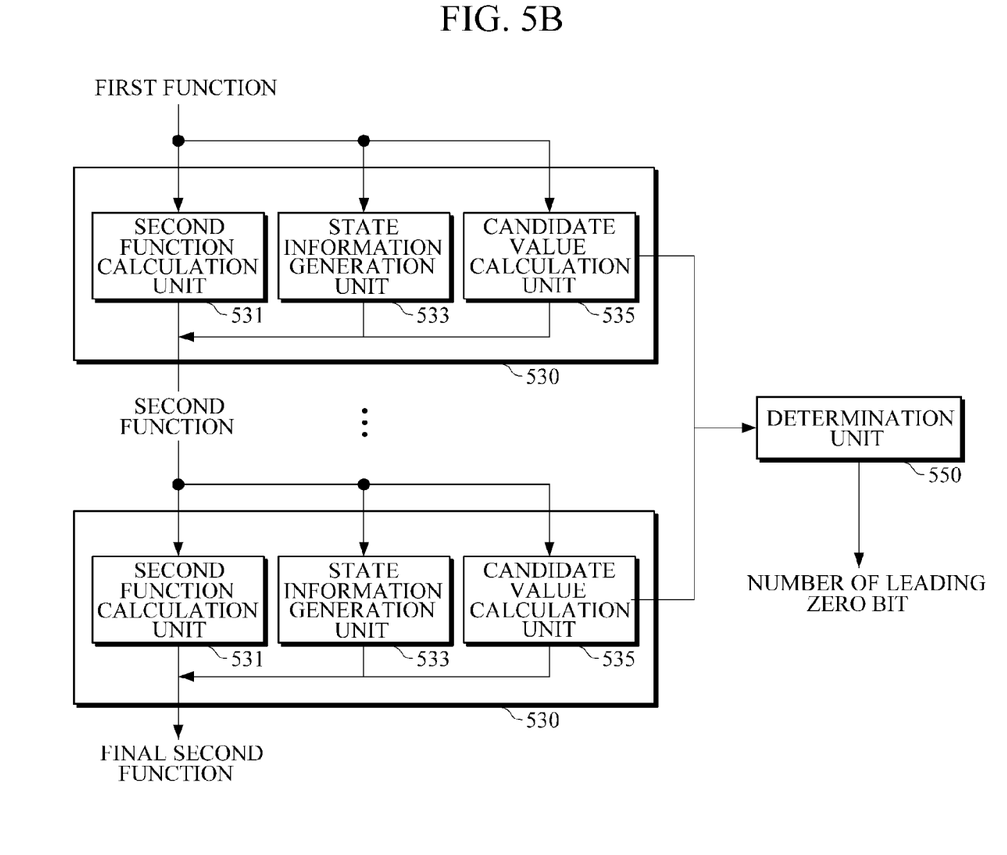
FIG. 5B is a diagram illustrating an example of the second function generation unit and the determination unit of the example illustrated in FIG. 5A.

FIG. 5B illustrates an example of the second function generation unit and the determination unit of the example illustrated in FIG. 5A.

Referring to the example illustrated in FIG. 5B, the second function generation unit 530 includes a second function calculation unit 531, a state information generation unit 533, and a candidate value calculation unit 535. The second function calculation unit 531 may pair every two consecutive first functions. The state information generation unit 533 may generate state information based on a comparison of properties of a generated new second function and the first function. For example, the second function calculation unit 531 may determine the second function based on each combination pair of the first functions with reference to the function combination requirements that are previously stored in a storage unit (not illustrated). An example of the function combination requirements are shown in FIG. 2. The determination unit 550 may combine a plurality of second functions into a new second function if the generated second function is not a final function. In this example, function combination requirements stored in the storage unit may be used.

In addition, the candidate value calculation unit 535 may include a candidate value generation unit (not illustrated) and a candidate value selection unit (not illustrated). The candidate value generation unit may generate one or more leading zero bit number candidate values with reference to predefined function combination requirements that are stored in a storage unit. For example, the candidate value selection unit may select one of the leading zero bit number candidate values that are generated by the candidate value generation unit. The candidate value calculation unit 535 may combine the generated zero bit number candidate value with a leading zero bit number candidate value of a preceding function to update the leading zero bit number candidate value.

The determination unit 550 may include a final function determination unit (not illustrated) and a control unit (not illustrated). For example, the final function determination unit may determine whether the second function generated by the second function generation unit 530 is a final function. If the second function is a final function, the control unit may determine that the leading zero bit number candidate value calculated by the candidate value calculation unit 535 is the final number of leading zero bits. As another example, the control unit may control the second function generation unit 530 to calculate a new second function and a new leading zero bit number candidate value.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of predicting the number of leading zero bits of a binary operation, the method comprising:

generating, by a processing device, $2^n$ first functions by performing a logical operation on two input binary numbers on a bit-by-bit basis;

calculating, by the processing device, a $2^{n-1}$ second functions by sequentially combining neighboring first functions and predicting a leading zero bit number candidate value of each of the second functions; and predicting, by the processing device, a final number of leading zero bits by recursively performing the calculating of the second functions and the predicting of the leading zero bit number candidate value, n−1 times.

2. The method of claim 1, wherein the calculating of the $2^{n-1}$ second functions comprises combining every two consecutive first functions into pairs, and calculating the $2^{n-1}$ second functions from each pair of the first functions, and the predicting of the leading zero bit number candidate value of the $2^{n-1}$ second functions are predicted according to predefined function combination requirements.

3. The method of claim 1, wherein the predicting of the final number of leading zero bits comprises recursively_combining every two consecutive second functions into pairs, updating the second function of each pair and the leading zero bit number candidate value of each second function according to the predefined function combination requirements, and in response to there being only one second function remaining, predicting a leading zero bit number candidate value of the remaining second function as a final number of leading zero bits.

4. The method of claim 3, wherein the updated leading zero bit number candidate value of the second function is a value obtained by combining a leading zero bit number candidate value of the updated second function and one of a plurality of previously generated leading zero bit number candidate values of the second function.

5. The method of claim 3, wherein each of the second function and the updated second function comprise two leading zero bit number candidate values.

6. The method of claim 3, wherein each of the second function and the updated second function comprise state change information.

7. The method of claim 1, wherein each first function is a logical operational function that generates a result value of 1 from a bitwise logical operation on the two binary numbers.

8. The method of claim 1, further comprising normalizing, by the processing device, the input two binary numbers to $2^n$ bits prior to generating the $2^n$ first functions.

9. An apparatus for predicting the number of leading zero bits of a binary operation, the apparatus comprising:
   a processing device configured to:
      generate $2^n$ first functions by performing a logical operation on two input binary numbers on a bit-by-bit basis;
      generate $2^{n-1}$ second functions by sequentially combining neighboring first functions and predict a leading zero bit number candidate value of each of the second functions; and
   determine a final number of leading zero bits by recursively performing the calculating of the second functions and the predicting of the leading zero bit number candidate value, n−1 times.

10. The apparatus of claim 9, wherein the processing device comprises:
   a bit normalization unit configured to normalize the input two binary numbers to $2^n$ bits; and
   a logical operation unit configured to perform a bitwise logical operation on the two binary numbers which have been normalized by the bit normalization unit, to produce a resultant value of 1.

11. The apparatus of claim 9, wherein the processing device comprises:
   a second function calculation unit configured to calculate the $2^{n-1}$ second functions by combining every two consecutive first functions; and
   a candidate value calculation unit configured to predict a leading zero bit number candidate value of each second function.

12. The apparatus of claim 11, wherein the processing device is further configured to combine a plurality of second functions to calculate an updated second function, in response to the plurality of second functions not being a final function.

13. The apparatus of claim 11, wherein the processing device further comprises:
   a candidate value generation unit configured to predict one or more leading zero bit number candidate values with reference to predefined function combination requirements stored in a storage unit; and
   a candidate value selection unit configured to select one of the leading zero bit number candidate values generated by the candidate value generation unit.

14. The apparatus of claim 11, wherein the processing device is further configured to combine the leading zero bit number candidate value predicted by the candidate value generation unit with the leading zero bit number candidate value selected by the candidate value selection unit to update the leading zero bit number candidate value.

15. The apparatus of claim 9, wherein the processing device comprises:
   a final function determination unit configured to determine whether a second function generated by the processing device is a final function; and
   a control unit configured to determine the leading zero bit number candidate value predicted by the processing device as a final number of leading zero bits if the second function is a final function, and otherwise to control the processing device to generate a new second function and a new leading zero bit number candidate value.

16. A method of predicting the number of leading zero bits of a binary operation, the method comprising:
   generating, by a processing device, less than $2^n$ first functions by performing a logical operation on two input binary numbers on a bit-by-bit basis;
   calculating, by the processing device, second functions by combining the first functions and predicting a leading zero bit number candidate value of each second function, wherein the calculating the second functions comprises adding at least one virtual second function to generate $2^{n-1}$ second functions; and
   predicting, by the processing device, a final number of leading zero bits by recursively performing the calculating of the second function and the predicting of the leading zero bit number candidate value, n−1 times.

17. The method of claim 16, wherein the logical operations on the two input binary numbers generates $2^n-1$ first functions, the calculating second functions based on the first functions generates $2^{n-1}-1$ second functions, and the adding comprises adding one virtual second function to generate $2^{n-1}$ second functions.

* * * * *